(12) United States Patent
Arakawa et al.

(10) Patent No.: US 8,959,981 B2
(45) Date of Patent: Feb. 24, 2015

(54) MOTION STATE OF IMPACTING AND IMPACTED OBJECT MEASURING APPARATUS AND METHOD

(75) Inventors: Masayoshi Arakawa, Tachikawa (JP);
Tetsuya Nakamura, Tachikawa (JP);
Takanori Shibui, Tachikawa (JP);
Tatsuya Ishikawa, Minato-ku (JP);
Masataka Kai, Minato-ku (JP);
Naoyuki Miyagawa, Minato-ku (JP)

(73) Assignees: Bridgestone Sports Co., Ltd., Tokyo (JP); Flovel Co., Ltd., Tokyo (JP)

( * ) Notice: Subject to any disclaimer, the term of this patent is extended or adjusted under 35 U.S.C. 154(b) by 423 days.

(21) Appl. No.: 13/358,803

(22) Filed: Jan. 26, 2012

(65) Prior Publication Data
US 2012/0190469 A1    Jul. 26, 2012

(30) Foreign Application Priority Data

Jan. 26, 2011    (JP) .................................. 2011-014182

(51) Int. Cl.
*G01N 3/30* (2006.01)
*A63B 57/00* (2006.01)
*G01P 7/00* (2006.01)
(Continued)

(52) U.S. Cl.
CPC .............. *G01S 13/58* (2013.01); *G01S 13/867* (2013.01); *A63B 69/0002* (2013.01); *A63B 69/36* (2013.01); *A63B 69/38* (2013.01); *A63B 24/0021* (2013.01); *A63B 2220/30* (2013.01); *A63B 2243/0025* (2013.01); *A63B 2024/0031* (2013.01); *A63B 2071/0694* (2013.01); *A63B 2220/35* (2013.01); *A63B 2220/806* (2013.01);
(Continued)

(58) Field of Classification Search
CPC ...................................................... G01S 13/867
USPC ............................................. 73/12.02; 367/90
See application file for complete search history.

(56) References Cited

U.S. PATENT DOCUMENTS 5,257,084 A * 10/1993 Marsh ............................. 356/28
6,456,232 B1 * 9/2002 Milnes et al. .................. 342/107
(Continued)

FOREIGN PATENT DOCUMENTS

JP    H06-178840 A    6/1994
JP    2006-326318 A    12/2006
(Continued)

OTHER PUBLICATIONS

Office Action in corresponding Japanese application No. 2011-014182, dated Apr. 1, 2014 (2 pages).

*Primary Examiner* — Harshad R Patel
(74) *Attorney, Agent, or Firm* — Osha Liang LLP

(57) ABSTRACT

A measurement apparatus includes a first Doppler sensor which outputs a first transmission signal and receives a first Doppler signal, that is the first transmission signal returned after being reflected by an impacting object, a timing detection unit that detects an impact timing which is a moment when an impacted object is impacted by the impacting object, an impacting object speed computing unit that computes a speed of the impacting object based on the first Doppler signals obtained from the detected impact timing to a timing before a predetermined period, and an imaging unit that images the impacted object immediately after the impact so as to be used for computing a motion state of the impacted object, based on the computed speed of the impacting object.

8 Claims, 5 Drawing Sheets

(51) Int. Cl.
   *G01S 13/58*   (2006.01)
   *G01S 13/86*   (2006.01)
   *A63B 69/00*   (2006.01)
   *A63B 69/36*   (2006.01)
   *A63B 69/38*   (2006.01)
   *A63B 24/00*   (2006.01)
   *A63B 71/06*   (2006.01)

(52) U.S. Cl.
   CPC ..... *A63B 2225/50* (2013.01); *A63B 2243/0004* (2013.01); *A63B 2243/0083* (2013.01)
   USPC ............................ 73/12.02; 473/199; 702/142

(56) References Cited

U.S. PATENT DOCUMENTS

| | | | |
|---|---|---|---|
| 6,567,536 B2* | 5/2003 | McNitt et al. | 382/107 |
| 8,142,301 B2* | 3/2012 | Haag et al. | 473/222 |
| 2007/0125152 A1* | 6/2007 | Brankov | 73/12.01 |
| 2011/0260890 A1* | 10/2011 | Larsen et al. | 341/20 |

FOREIGN PATENT DOCUMENTS

| | | |
|---|---|---|
| JP | 2010-025737 A | 2/2010 |
| JP | 2010022739 A | 2/2010 |
| JP | 2010-155074 A | 7/2010 |

* cited by examiner

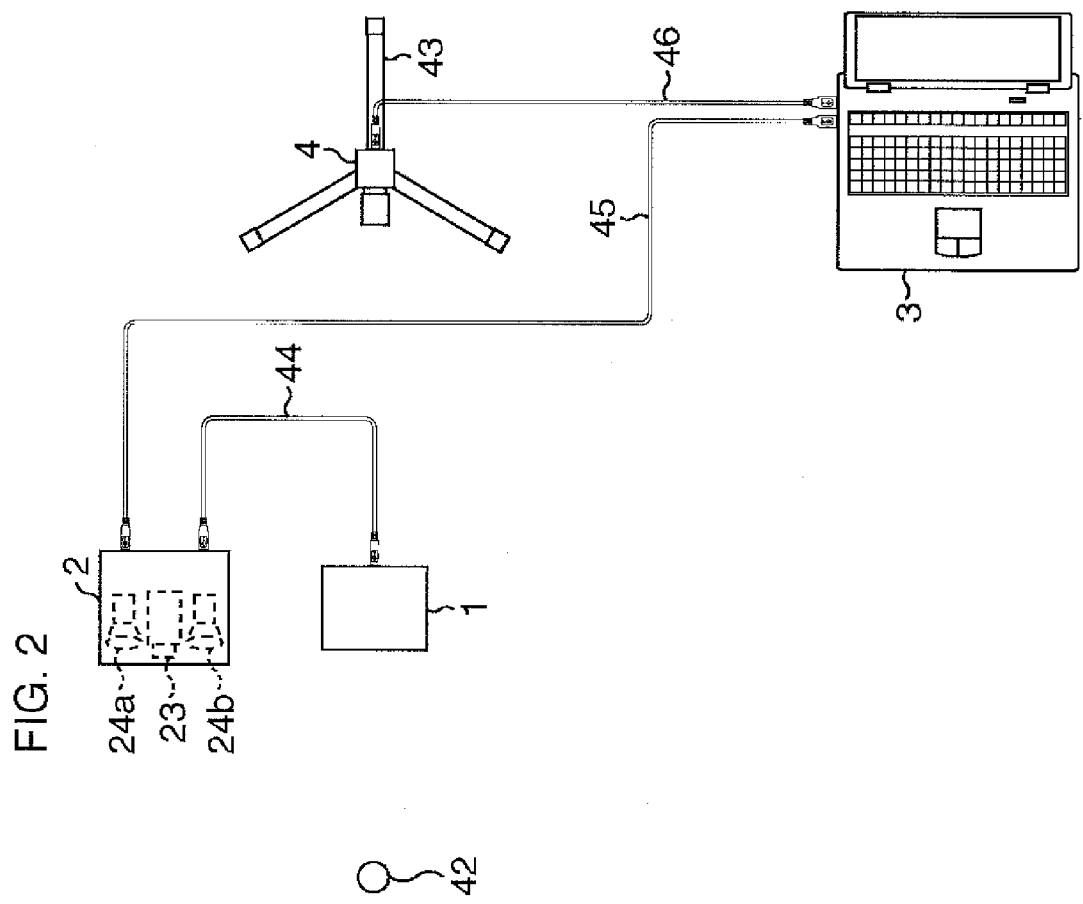
FIG. 2

MOTION STATE OF IMPACTING AND IMPACTED OBJECT MEASURING APPARATUS AND METHOD

BACKGROUND OF THE INVENTION

1. Field of the Invention

The present invention relates to a measurement apparatus and a measurement method, and more particularly to a measurement apparatus and a measurement method which allow to accurately measure motion states of both an impacting object and an impacted object.

2. Description of the Related Art

In such sports as baseball, golf, tennis and soccer, it is important to measure the speed of an impacting object, such as a bat, golf club and tennis racket used by a player, or a leg of a soccer player, in order to measure the capability of a player in terms of power. It is also important to measure the speed of an impacted object, such as a baseball, golf ball, tennis ball and soccer ball, in order to measure the quality of the impact (shot) performed by a player, that is to measure the performance level.

Therefore it is a basic and important measurement to simultaneously measure the speed of an impacting object and that of an impacted object in sports, in order to improve the performance in a respective sport. Various methods have been used for these measurements, such as a method of using images, a method of using magnetism, a method of using an optical sensor, and a method of using a Doppler sensor; but the method of using a Doppler sensor, in particular, is frequently used lately, since it is simple and has low cost.

For example, the speed of a club head during swinging is measured in golf using a Doppler sensor (e.g. Japanese Patent Application Laid-Open No. 2006-326318). In some cases, both the speed of a club head (head speed) as an impacting object and the speed of a golf ball (ball speed) as an impacted object are measured in golf using a Doppler sensor (e.g. Japanese Patent Application Laid-Open No. 2010-025737).

However according to the measurement method disclosed in Japanese Patent Application Laid-Open No. 2010-025737, the speed of a club head and the speed of a golf ball are measured based on the Doppler signals obtained by one Doppler sensor. In this case, the critical issue is whether the Doppler signals obtained from one Doppler sensor can be appropriately separated into signals for the club head and signals for the golf ball, however accurate separation of signals is difficult if the speed of the club head and the speed of the golf ball are similar. This may make it difficult to accurately measure the motion states of the club head and the golf ball.

SUMMARY OF THE INVENTION

With the foregoing in view, it is an object of the present invention to measure the motion states of both an impacting object and an impacted object more accurately.

A measurement apparatus according to an aspect of the present invention comprises: a first Doppler sensor which outputs a first transmission signal and receives a first Doppler signal, that is the first transmission signal returned after being reflected by an impacting object; a timing detection unit that detects an impact timing, that is a moment when an impacted object is impacted by the impacting object; an impacting object speed computing unit that computes a speed of the impacting object based on the first Doppler signals obtained from the detected impact timing to a timing before a predetermined period; and an imaging unit that images the impacted object immediately after the impact so as to be used for computing a motion state of the impacted object, based on the computed speed of the impacting object.

A measurement method according to an aspect of the present invention is a measurement method by a measurement apparatus having a Doppler sensor, a timing detection unit, a computing unit and an imaging unit, the method comprising the steps of: the Doppler sensor outputting a transmission signal and receiving a Doppler signal, that is the transmission signal returned after being reflected by an impacting object; the timing detection unit detecting an impact timing, which is a moment when an impacted object is impacted by the impacting object; the computing unit computing a speed of the impacting object based on the Doppler signals obtained from the detected impact timing to a timing before a predetermined period; and the imaging unit imaging the impacted object immediately after the impact so as to be used for computing a motion state of the impacted object, based on the computed speed of the impacting object.

According to an aspect of the present invention, a transmission signal is output from the Doppler sensor, and a Doppler signal, that is the transmission signal returned after being reflected by an impacting object, is received by the Doppler sensor. An impact timing, which is a moment when an impacted object is impacted by the impacting object, is detected, speed of the impacting object is computed based on the Doppler signal from the detected impact timing to a timing before a predetermined period, and the impacted object immediately after the impact is imaged, so as to be used for computing the motion state of the impacted object, based on the computed speed of the impacting object.

According to an aspect of the present invention, the motion states of both an impacting object and an impacted object can be measured more accurately.

BRIEF DESCRIPTION OF THE DRAWINGS

FIG. 2 is a diagram depicting an arrangement example of the measurement system in FIG. 1;

DESCRIPTION OF THE PREFERRED EMBODIMENTS

Configuration Example of Measurement System

Figure 1:
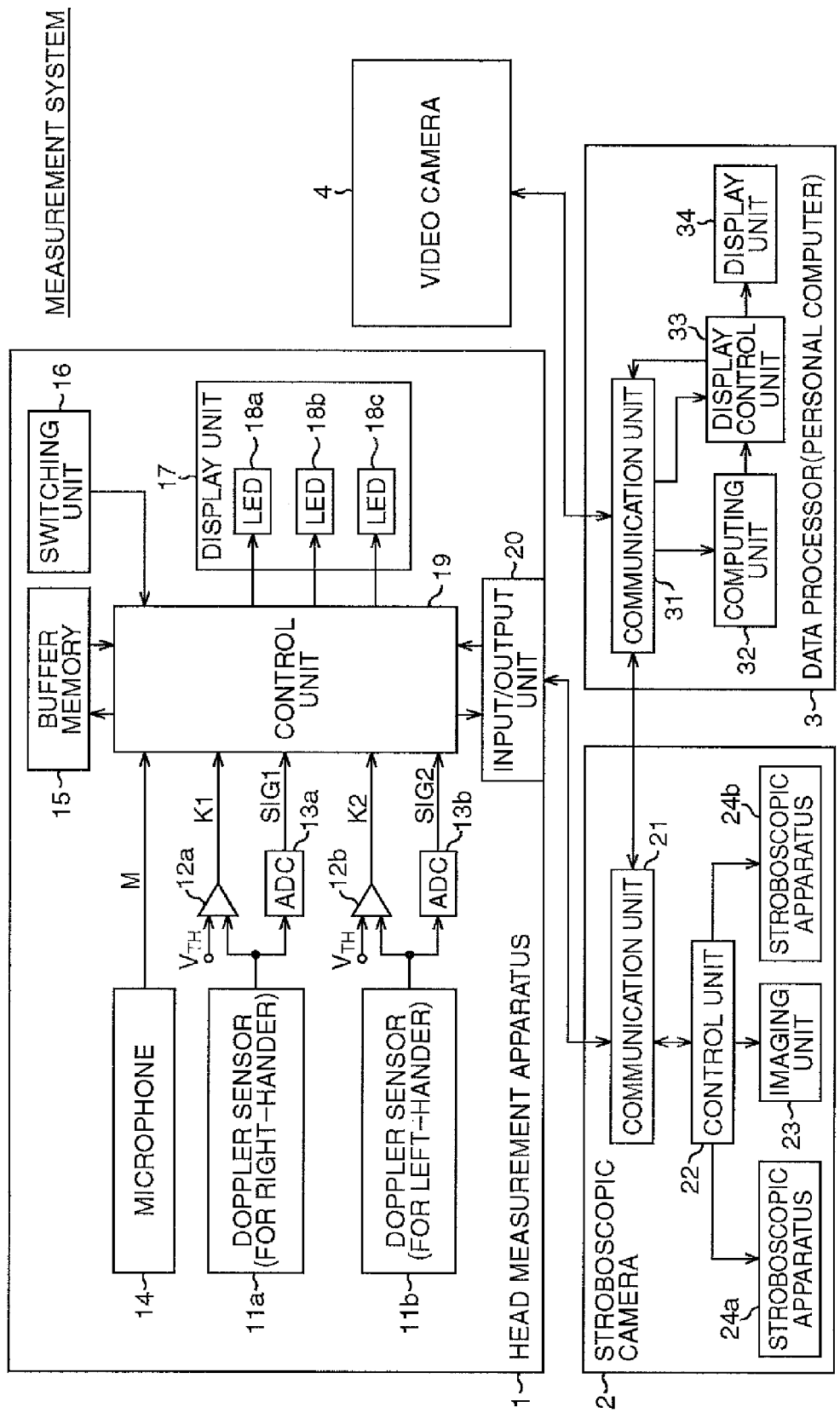
FIG. 1 is a block diagram depicting a configuration example of an embodiment of a measurement system to which the present invention is applied.

FIG. 1 is a configuration example of an embodiment of a measurement system to which the present invention is applied.

The measurement system of FIG. 1 has a head measurement apparatus 1, a stroboscopic camera 2, a data processor 3 and a video camera 4, and is a system for simultaneously measuring speed of a golf club, which is an impacting object, and speed of a golf ball, which is an impacted object when a player (subject) swings the golf club and impacts the golf ball placed in a predetermined position. Hereafter the speed of the golf club is also called "head speed", and the speed of the golf ball is also called "ball speed".

The measurement system in FIG. 1 has an impact measurement mode (first measurement mode) in which the speed of the golf club and the speed of the golf ball at the moment when the golf ball is impacted by the golf club are measured and displayed, and a measurement-with-image mode (second measurement mode) in which not only measuring the speed of the golf club and the speed of the golf ball, but also the image of the entire swing operation of the player is also obtained and displayed.

The head measurement apparatus 1 has two sets of Doppler sensor 11, comparator 12 and ADC (A/D converter) 13. The Doppler sensor 11 outputs a microwave signal as a transmission signal, and receives a reflection signal which is generated when the transmission signal, which was output, is reflected by a predetermined object, whereby the frequency is changed to a predetermined Doppler frequency (hereafter Doppler signal). The frequency of the transmission signal which the Doppler sensor 11 outputs is 24.11 GHz, for example. The comparator 12 compares the output level of the Doppler signal received by the Doppler sensor 11 with a reference level $V_{TH}$, which is set in advance, and outputs a detection signal K1 or K2, which indicates that the measurement target object is detected, if the output level is the reference level $V_{TH}$ or more. The ADC 13 performs AD conversion for the Doppler signal, which is output by the Doppler sensor 11, using a predetermined number of bits (e.g. 16 bits), and outputs the Doppler signal SIG1 or SIG2 digitized by the AD conversion.

Out of the two sets of Doppler sensor 11, a comparator 12 and an ADC 13, one set is for detecting the head speed of a right-handed player, and the other set is for detecting the head speed of the left-handed player respectively. In this embodiment, the Doppler sensor 11a, the comparator 12a and the ADC 13a are set for a right-hander, and the Doppler sensor 11b, the comparator 12b and the ADC 13b are set for a left-hander. The position where the Doppler sensor 11 is installed in the head measurement apparatus 1 is different between the setting for a right-hander and the setting for a left-hander, and details will be described later with reference to FIG. 3.

In the following description, a case when setting is for a right-handed player will be primarily described, and differences to be made when the setting is for a left-handed player will be described if necessary.

The head measurement apparatus 1 also has a microphone 14, a buffer memory 15, a switching unit 16, a display unit 17, a control unit 19 and an input/output unit 20.

The microphone 14 obtains a voice signal M when the golf ball (impacted object) is impacted by the golf club (impacting object), so as to detect a timing of a moment of impact, that is a moment when the golf ball (impacted object) is impacted by the golf club (impacting object).

The buffer memory 15 stores, based on the control of the control unit 19, the Doppler signals SIG1, which are output from the Doppler sensor 11a, or the Doppler signals SIG2, which are output from the Doppler sensor 11b, for a predetermined amount of data which corresponds to the predetermined measurement time. The buffer memory 15 is a ring buffer, and if a new Doppler signal of which level is the reference level $V_{TH}$ or more is supplied, the predetermined amount of stored data is updated sequentially from the older data. In the case of setting for right-handers, for example, the Doppler signals SIG1 are written for all the data areas sequentially from a less significant address, and if data is written for all the data areas, new data is overwritten sequentially from older data (that is from a less significant address), thereby a predetermined amount (predetermined time) of the latest Doppler signals SIG1 are stored in the buffer memory 15. In the case of setting for left-handers, the Doppler signals SIG2, instead of the Doppler signals SIG1, are stored in the buffer memory 15 in the same manner.

The switching unit 16 is constituted by a DIP switch, for example, to switch the operation setting between the setting for right-handed players and the setting for left-handed players. In other words, the switching unit 16 switches whether the Doppler signals of the Doppler sensor 11a are used or the Doppler signals of the Doppler sensor 11b are used for the control unit 19 to compute the speed of the golf club. The operation setting between the setting for right-handed players and the setting for left-handed players may be switched based on a control signal supplied from the data processor 3 via the input/output unit 20, by connecting the head measurement apparatus 1 and the data processor 3. In this case, the switch unit 16 can be omitted.

The display unit 17 has three LEDs 18a to 18c, and turns the LEDs 18a to 18c ON or OFF based on the control signal from the control unit 19. The first LED 18a turns ON if the Doppler sensor 11a detects an object (golf club). The second LED 18b turns ON if an impact is detected. And the third LED 18c turns ON if the Doppler sensor 11a detects an object (golf club), and an impact is detected within a predetermined time after detecting the object. In other words, the third LED 18c turns ON if the second LED 18b turns ON within a predetermined time after the first LED 18a turns ON. Although details will be mentioned later, the third LED 18c in the ON state means that the head speed computed by the control unit 19 has been output to the stroboscopic camera 2.

The three LEDs 18a to 18c may indicate the respective state by flashing instead of remaining lit. A control signal for controlling the lighting of the three LEDs 18a to 18c may be transmitted to the data processor 3, so as to display the same indication of the LEDs 18a to 18c on the later mentioned display unit 34 of the data processor 3. In this case, the display unit 17 can be omitted.

The control unit 19 controls the Doppler signals SIG1 and SIG2 based on the setting of the switching unit 16. In other words, if the operation for right-handers is set by the switching unit 16, the control unit 19 starts writing the Doppler signals SIG1 supplied from the ADC 13a to the buffer memory 15 from the point when a detection signal K1, to notify that an object (golf club) was detected, is supplied from the comparator 12a. Then the control unit 19 starts computing a head speed when data (Doppler signals SIG1) sufficient for measuring the head speed is stored in the buffer memory 15. The head speed is computed every time a new Doppler signal SIG1 is supplied to the buffer memory 15. In other words, the latest head speed measured at a timing closest to the moment of impact can be constantly determined by updating the head speed as the Doppler signals SIG1 are updated.

The head speed can be determined by the following formula for the Doppler effect.

$$V=(c \cdot F_d)/(2 \cdot F_t)$$

where c denotes light velocity (299792485 m/s), $F_d$ denotes frequency of the received Doppler signal SIG1 (Doppler frequency), and $F_t$ denotes output frequency of the Doppler sensor 11a.

If a moment of impact indicated by the voice signal M from the microphone 14 is detected within a predetermined time after the detection signal K1 is supplied, the control unit 19 transmits the head speed measured immediately before the moment of impact to the stroboscopic camera 2 via the input/output unit 20. After the head speed, which is the measurement result, is transmitted to the stroboscopic camera 2, the control unit 19 ends (stops) writing the Doppler signals SIG1 to the buffer memory 15.

The control unit 19 also controls the lighting of the LEDs 18a to 18c of the display unit 17. For example, the control unit 19 turns the first LED 18a ON if the detection signal K1 is supplied from the comparator 12a, and turns the second LED 18b ON if the voice signal M is supplied from the microphone 14 within a predetermined time after the detection signal K1 is supplied. Then the control unit 19 turns the third LED 18c ON if the head speed, which is the measurement result, is output to the stroboscopic camera 2. The control unit 19 also controls turning the LEDs 18a to 18c OFF.

By turning the LEDs 18a to 18c ON corresponding to the detection of a golf club, detecting a moment of impact, and outputting a head speed, which is the measurement result, like this, it can be known at first sight whether or not the measurement data was obtained normally.

If operation for left-handers is set by the switching unit 16, the control unit 19 performs the same control using the detection signal K2 and the Doppler signal SIG2, instead of the above mentioned detection signal K1 and the Doppler signal SIG1. Therefore one of the two sets of the Doppler sensor 11, comparator 12 and ADC 13 is not used, depending on whether the setting is for right-handers or left-handers. If the head measurement apparatus 1 is designed for right-handers only or for left-handers only, then the switching unit 16, and one set of the Doppler sensor 11, comparator 12 and ADC 13 for left-handers or right-handers that is not used, can be omitted, and cost can be decreased.

The stroboscopic camera 2 has a communication unit 21, a control unit 22, an imaging unit 23 and a stroboscopic apparatus 24. There are two stroboscopic apparatuses 24, that is a stroboscopic apparatus 24a and a stroboscopic apparatus 24b.

The communication unit 21 is connected with the input/output unit 20 of the head measurement apparatus 1, and obtains the head speed value measured by the head measurement apparatus 1, and supplies the data to the control unit 22. The communication unit 21 is also connected with the communication unit 31 of the data processor 3, and transmits (data on) two images, which was captured by the imaging unit 23 and supplied from the control unit 22 to the data processor 3.

The control unit 22 determines two timings when imaging unit 23 performs imaging, based on the head speed, which was measured by the head measurement apparatus 1 and supplied from the communication unit 21, and controls the imaging unit 23 and the stroboscopic apparatus 24 based on the determined imaging timings.

In concrete terms, the control unit 22 determines the first imaging timing and the second imaging timing (interval between the first imaging timing and the second imaging timing), based on the head speed supplied from the communication unit 21. When the first imaging timing determined above occurs, the control unit 22 controls the stroboscopic apparatus 24a to emit stroboscopic light, and controls the imaging unit 23 at the same time to capture the image. When the second imaging timing determined above occurs, the control unit 22 controls the stroboscopic apparatus 24b to emit stroboscopic light, and controls the imaging unit 23 at the same time to capture the image. Thereby two images on the golf ball immediately after impact, captured at two different timings, are obtained. In other words, the control unit 22 determines the imaging timings such that when the imaging unit 23 performs imaging twice based on the head speed supplied from the communication unit 21, the golf ball is captured in each image. The control unit 22 outputs the two images captured by the two imaging operations to the data processor 3 via the communication unit 21, along with the head speed value measured by the head measurement apparatus 1.

The imaging unit 23 is constituted by a CCD (Charge Coupled Device) camera, or a CMOS (Complementary Metal Oxide Semiconductor) sensor camera, for example, and performs imaging at the imaging timings instructed by the control unit 22, and supplies two images obtained as a result to the control unit 22. The two images captured by imaging by the imaging unit 23 are used for the computing unit 32 of the data processor 3 to compute the motion state (speed) of the golf ball immediately after the impact.

The stroboscopic apparatus 24 is an illumination apparatus which can emit stroboscopic light, and emits stroboscopic light at an imaging timing instructed by the control unit 22, and irradiates light onto the golf ball. The stroboscopic apparatus 24a is a stroboscopic apparatus 24 used for the first imaging, and the stroboscopic apparatus 24b is a stroboscopic apparatus 24 used for the second imaging.

The data processor 3 has a communication unit 31, a computing unit 32, a display control unit 33 and a display unit 34. The data processor 3 is constituted by a personal computer, for example.

The communication unit 31 exchanges data with the stroboscopic camera 2 and the video camera 4 according to a predetermined data format. In concrete terms, the communication unit 31 receives the head speed value and the two images captured immediately after the impact, which are supplied from the stroboscopic camera 2, and supplies this data to the computing unit 32, and in the measurement-with-image mode, the communication unit 31 also obtains the moving image data captured by imaging the swing operation of the player, which is supplied from the video camera 4, and supplies this data to the display control unit 33. The communication unit 31 transmits the control command, which is supplied from the display control unit 33, to the video camera 4.

The computing unit 32 supplies the head speed value, which is measured by the head measurement apparatus 1 and is supplied via the stroboscopic camera 2, to the display control unit 33. The head speed may be directly supplied from the communication unit 31 to the display control unit 33.

The computing unit 32 also calculates a motion state of the golf ball, that is at least one of speed, rotation frequency per unit time and rotation direction, based on the two images of the golf ball captured by the stroboscopic camera 2 immediately after the impact, and supplies the data to the display control unit 33. In the impact measurement mode of this embodiment, it is assumed that at least the speed of the golf ball is determined.

The speed of the golf ball, the rotation frequency of the golf ball per unit time, and the rotation direction can be calculated using the following method. Characters and a mark (logo) of a manufacturer's name or brand name of a golf ball manufacturer are often printed on the surface of a golf ball. The computing unit 32 detects a part of such characters or a mark on the surface of the golf ball as a "characteristic point". By comparing the positions of the corresponding characteristic points between the first image obtained in the first imaging and the second image obtained in the second imaging, the moving distance, the rotation frequency and the rotation direction of the golf ball are calculated. The speed of the golf ball is determined by dividing the moving distance of the golf ball by the interval between the imaging time of the first image and the imaging time of the second image. The interval between the imaging time of the first image and the imaging time of the second image can be obtained when the two images are obtained from the stroboscopic camera 2. Detailed methods for calculating the speed of the golf ball and the rotation frequency of the golf ball per unit time and the rotation direction are disclosed in, for example, Japanese Patent Application Laid-Open No. 2009-247642, which are applied by the present inventor.

The speed of the golf ball, the rotation frequency and rotation direction of the golf ball determined by the computing unit 32 are supplied to the display control unit 33 along with the head speed value, which is the measurement result by the head measurement apparatus 1.

In impact measurement mode, the display control unit 33 displays both the speed of the golf club and the speed of the golf ball on the display unit 34.

Beside the speed of the golf club and the speed of the golf ball, the display control unit 33 can also display a contact average, obtained by dividing the speed of the golf ball (ball speed) [m/s] by the speed of the golf club (head speed) [m/s], on the display unit 34. Further, the display control unit 33 may display the standard carry of the golf ball determined by a predetermined formula using the ball speed along with the above data. The standard carry of the golf ball can be determined by, for example, (ball speed [m/s]×3.8) [yards].

Furthermore, in the measurement-with-image mode, the display control unit 33 displays, on the display unit 34, the speed of the golf club and the speed of the golf ball determined by the computing unit 32, so as to superpose on the moving image of the swing operation of the player obtained from the video camera 4 via the communication unit 31. Instead, the display control unit 33 may measure the trajectory (locus of the flying ball) of the golf ball based on the speed, rotation frequency and rotation direction of the golf ball determined by the computing unit 32, and display the data on the display unit 34.

An image at the moment of the impact can be specified as follows, for example, out of the moving images during a predetermined period when the swing operation of the player was captured. A timing signal (voice signal M), to notify the detection of the impact, is supplied from the head measurement apparatus 1 to the data processor 3 via the stroboscopic camera 2. In this case, the input/output unit 20 of the head measurement apparatus 1 starts count operation by the internal counter as soon as the timing signal is output to the stroboscopic camera 2. The display control unit 33 of the data processor 3 obtains the timing signal via the stroboscopic camera 2, and recognizes the detection of impact, and also reads the count value of the input/output unit 20, and obtains the delay amount due to communication (time difference from the input/output unit 20 outputting the timing signal to the display control unit 33 recognizing the timing signal). Then the display control unit 33 determines the image at the moment of impact as an image captured by the video camera 4 at a time when the delay amount is subtracted from the time when the timing signal was received. Thereby the image at the moment of the impact can be accurately specified out of the moving images of the entire swing operation captured by the video camera 4, and the display control unit 33 displays a predetermined number of images captured before and after the image at the moment of the impact, on the display unit 34 as the moving image of the entire swing operation. The head measurement apparatus 1 and the data processor 3 may be directly connected, not via the stroboscopic camera 2, and the timing signal and the count value may be obtained directly from the head measurement apparatus 1.

The display unit 34 is constituted by a liquid crystal display, for example, and displays the speed of the golf club and the speed of the golf ball in the impact measurement mode. In the measurement-with-image mode, the display unit 34 displays not only the speed of the golf club and the speed of the golf ball, but also the moving image of the swing operation of the player and trajectory of the golf ball.

If the speed of the computing result is exactly the same as the previous computing result, it may not be clear whether the displayed result is the previous measurement or the new measurement. Therefore when the latest measurement result is displayed, initially the LED indicating the measurement result may be blinking for a predetermined time to thereby indicate an update of the display of the measurement result.

The video camera 4 is constituted by a video camera or a video still camera which can capture moving images, and captures image in the measurement-with-image mode according to the control of the video processor 3, and supplies the obtained moving image data to the data processor 3. The moving image data supplied from the video camera 4 to the data processor 3 includes the capturing time of each image constituting the moving image as meta data. The video camera 4 can be omitted if only the impact measurement mode is used.

[Arrangement Example of Measurement System]

FIG. 2 is a top view depicting a positional relationship of the measurement system in FIG. 1, a golf ball and a player. FIG. 2 is a case when the player is right-handed.

When the player (feet) 41 is positioned facing the golf ball 42, the head measurement apparatus 1 is disposed at a distant position beyond the golf ball 42 on a straight line connecting the player 41 and the golf ball 42, and a video camera 4 is disposed at a further distant position beyond the head measurement apparatus 1. In other words, the player 41, the golf ball 42, the head measurement apparatus 1 and the video camera 4 are lined up in this sequence in a approximately straight line. The video camera 4 is secured by a tripod 43.

The stroboscopic camera 2 is disposed next to the head measurement apparatus 1 in the ball trajectory direction. The position where the stroboscopic camera 2 is installed can be determined to be an optimum position according to the imaging timing of the stroboscopic camera 2. For example, regarding the imaging timing to be approximately the same as the moment of impact, the stroboscopic camera 2 may be disposed on the head measurement apparatus 1.

The head measurement apparatus 1 and the stroboscopic camera 2 are connected via a USB cable 44. The stroboscopic camera 2 and the data processor 3 are also connected via a USB cable 45. The data processor 3 and the video camera 4 are also connected via a USB cable 46. Various connection methods, either cable or wireless, can be used to connect apparatuses, such as RS-232C, LAN, Bluetooth® and infrared communication.

In the present embodiment, the head measurement apparatus 1, the stroboscopic camera 2, the data processor 3 and the video camera 4 are installed independently, however all or a part of these apparatuses may be integrated. For example, the head measurement apparatus 1 and the stroboscopic camera 2 may be integrated, or the data processor 3 and the video camera 4 may be integrated, as in the case of a personal computer as the data processor 3 having a camera as the video camera 4.

[Relationship of Doppler Sensor 11 and Measurement Range]

Figure 3:
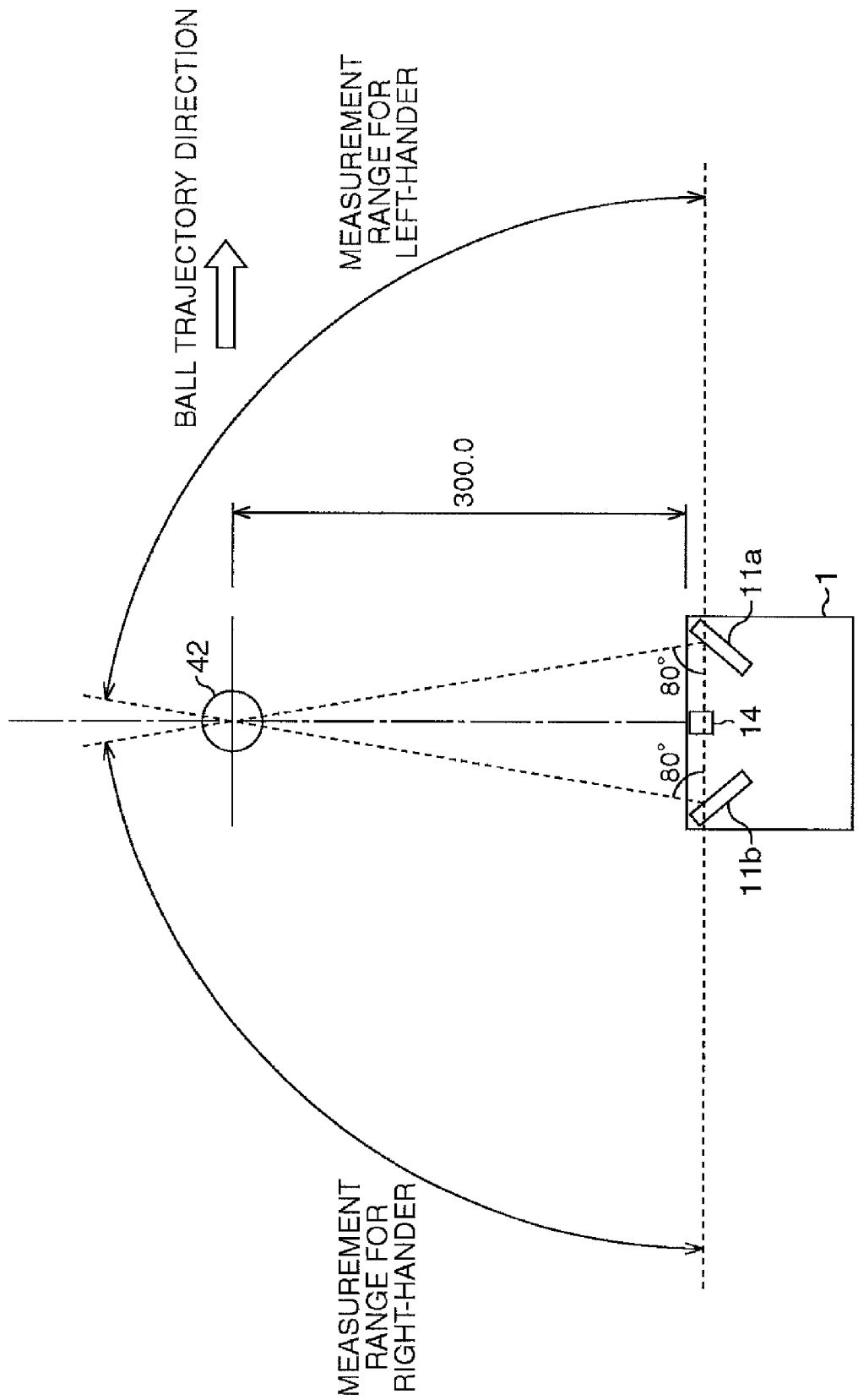
FIG. 3 is a diagram depicting a relationship of two Doppler sensors in the measurement apparatus and respective measurement ranges thereof.

Now the relationship between the two Doppler sensors 11 in the head measurement apparatus 1 and the respective measurement ranges will be described with reference to FIG. 3. FIG. 3, just like FIG. 2, shows an example when the player is right-handed.

The line connecting the microphone 14 in the head measurement apparatus 1 and the golf ball 42 intersects orthogonally with the line connecting the two Doppler sensors 11a and 11b, and the microphone 14 is disposed on the line connecting the two Doppler sensors 11a and 11b, at the mid-point between the two Doppler sensors 11a and 11b. This means that the two Doppler sensors 11a and 11b are disposed symmetrically with respect to the line connecting the golf ball 42 and the microphone 14.

In the present embodiment, it is assumed that the respective microwave radiation angle of the Doppler sensor 11a and the Doppler sensor 11b are 80° for example. The Doppler sensor 11a is disposed so that the 80° sectorial measurement range turns to the opposite direction of the trajectory direction of the golf ball 42 (back side of the ball trajectory direction) from the position where the golf ball 42 is placed, as shown in FIG. 3. The Doppler sensor 11b, on the other hand, is disposed so that the 80° sectorial measurement range turns to the direction the same as the ball trajectory direction from the position where the golf ball 42 is placed.

In this positional relationship, if the player is right-handed, the golf club up to impacting with the golf ball 42 is detected within the measurement range of the Doppler sensor 11a. If the player is left-handed, on the other hand, the golf club up to impacting with the golf ball 42 is detected within the measurement range of the Doppler sensor 11b. Therefore the Doppler sensor 11a is the head speed detection sensor for right-handed players, and the Doppler sensor 11b is the head speed detection sensor for left-handed players.

In the example shown in FIG. 3, the distance between the golf ball 42 and the head measurement apparatus 1 is set to 300 mm, but an appropriate distance between the golf ball 42 and the head measurement apparatus 1 is approximately 300 to 600 mm.

[Measurement Processing in Impact Measurement Mode]

Now measurement processing in the impact measurement mode will be described with reference to the flow chart in FIG. 4. It is assumed that the operation setting in the impact measurement mode has been performed before starting this processing. Setting by the switching unit 16 of the head measurement apparatus 1 is for right-handers, and the Doppler sensor 11a starts outputting microwaves as soon as the power of the head measurement apparatus 1 is turned ON.

First in step S1, the control unit 19 determines whether the Doppler sensor 11a detected an object, that is a golf club. In concrete terms, whether the Doppler sensor 11a detected the golf club or not is determined by determining whether a detection signal K1 was supplied from the comparator 12a, and the determination processing in step S1 is repeated until it is determined that the Doppler sensor 11a detected the golf club.

If it is determined that the Doppler sensor 11a detected the golf club in step S1, processing advances to S2, and the control unit 19 turns the first LED 18a ON, and starts counting time.

In step S3, the control unit 19 starts storing (writing) the Doppler signals SIG1 of the Doppler sensor 11a, which are digitized and supplied by the ADC 13a, to the buffer memory 15.

In step S4, the control unit 19 determines whether sufficient data (Doppler signals SIG1), for measuring the head speed, are stored in the buffer memory 15. In order to measure the head speed accurately, the Doppler signals SIG1 are required for a certain period of time. In step S4, it is determined whether the Doppler signals SIG1 received during a predetermined period, which are set for accurately measuring the head speed, are stored in the buffer memory 15 or not, and processing in step S4 is repeated until it is determined that the Doppler signals SIG1 are stored. The processing in step S4 however has timed out, therefore if the state determined as NO in step S4 continues for a lengthy time and a time out is generated, processing returns to step S1.

If it is determined that sufficient data for measuring the head speed was stored in the buffer memory 15 in step S4, processing advances to step S5, and the control unit 19 starts measuring the head speed. After this processing, the head speed is recalculated (updated) every time a new Doppler signal SIG1 is supplied to the buffer memory 15.

In step S6, the control unit 19 determines whether the Doppler sensor 11a detected an impact sound of the golf ball within a predetermined time after the Doppler sensor 11a detected the golf club. To be more specific, the control unit 19 determines whether a voice signal M, when the golf club impacted with the golf ball, was supplied from the microphone 14 before the counting which started in step S2 reaches a predetermined count value.

If it is determined that the impact sound of the golf ball was not detected within the predetermined time in step S6, processing advances to step S7, where the control unit 19 ends storing the Doppler signals from the Doppler sensor 11a to the buffer memory 15, and in step S8, the control unit 19 turns the first LED 18a OFF, and ends the measurement processing.

Figure 4:
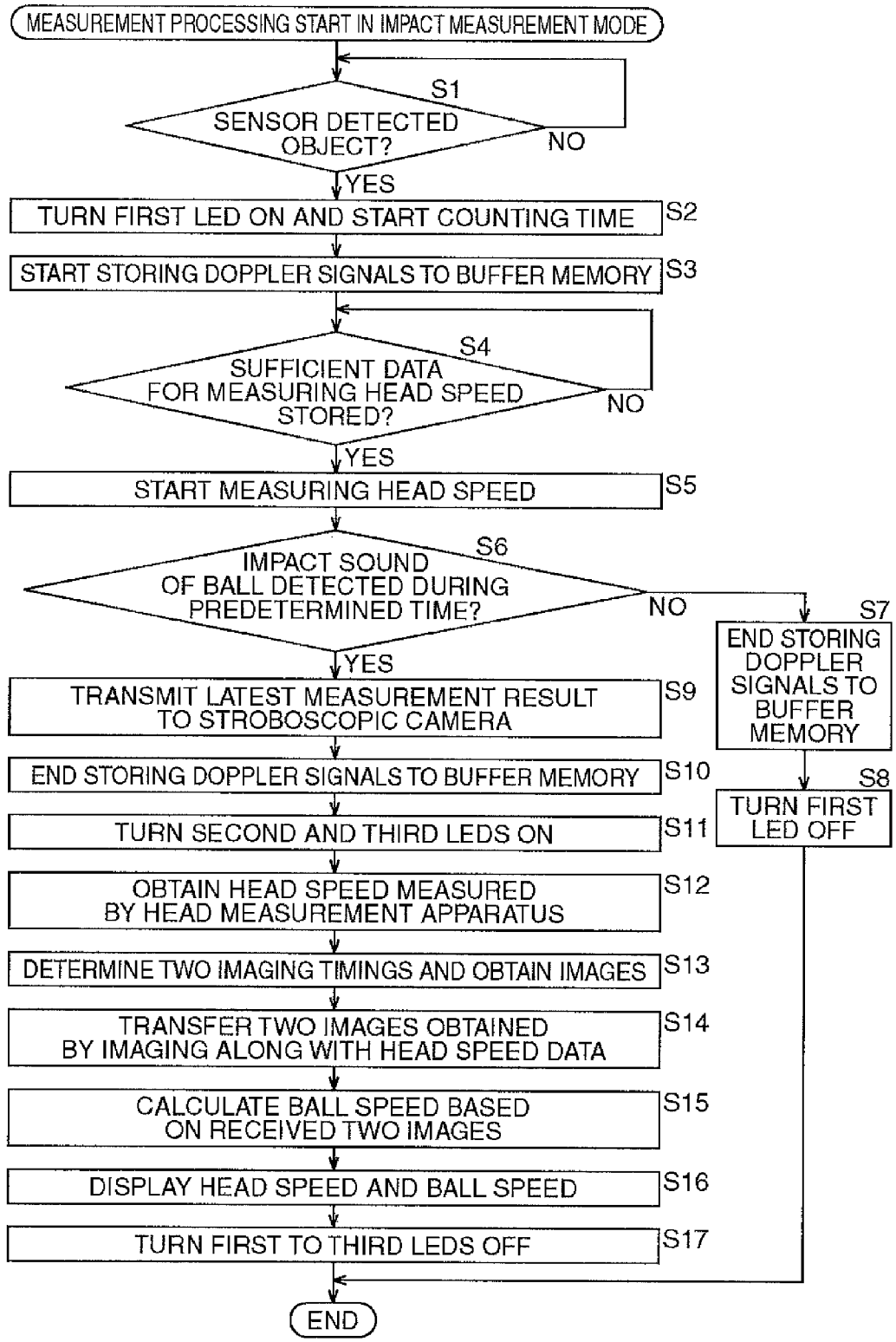
FIG. 4 is a flow chart depicting a measurement processing in an impact measurement mode.

Therefore in the measurement processing in FIG. 4, measurement is not performed if an impact sound of the golf ball is not detected within the predetermined time after the golf club is detected by the Doppler sensor 11a.

If it is determined that the impact sound of the golf ball was detected within the predetermined time in step S6, on the other hand, processing advances to step S9, and the control unit 19 transmits the latest head speed measurement result to the stroboscopic camera 2 via the input/output unit 20.

Then in step S10, the control unit 19 ends storing the Doppler signals from the Doppler sensor 11a to the buffer memory 15, and turns the second and third LEDs 18b and 18c ON in step S11.

In step S12, the control unit 22 of the stroboscopic camera 2 obtains the head speed, which was measured by the head measurement apparatus 1, via the communication unit 21.

In step S13, the control unit 22 determines two imaging timings which the imaging unit 23 executed based on the obtained-head speed, and causes the imaging unit 23 to execute imaging according to the determined imaging timings. At the imaging timing instructed by the control unit 22, the stroboscopic apparatus 24 emits stroboscopic light, and the imaging unit 23 captures the image.

In step S14, the control unit 22 transfers the two images obtained by the two imaging operations to the data processor 3 via the communication unit 21, along with the head speed measured by the head measurement apparatus 1.

In step S15, the computing unit 32 of the data processor 3 calculates the ball speed based on the two images received from the stroboscopic camera 2. The calculated ball speed is supplied to the display control unit 33 along with the head speed, which is a measurement result by the head measurement apparatus 1.

In step S16, the display control unit 33 causes the display unit 34 to display the head speed and the ball speed supplied from the computing unit 32.

In step S17, the control unit 19 of the head measurement apparatus 1 turns the first to third LEDs 18a to 18c OFF at a predetermined time, which is a predetermined time after output of the head speed and a predetermined time after the display of the head speed and ball speed, and ends the processing.

As described above, according to the measurement processing in the impact measurement mode, the head measurement apparatus 1 continuously measures the head speed until the moment of impact, based on the Doppler signals received during a predetermined period, and detects the moment of impact by the voice signal M (impact sound of the golf ball). The head speed measured immediately before the impact is supplied to the stroboscopic camera 2.

Based on the head speed measured by the head measurement apparatus 1, the stroboscopic camera 2 determines two imaging timings to image the golf ball immediately after the impact, and captures the images. Then the data processor 3 calculates the ball speed of the golf ball based on the two captured images.

In other words, according to the measurement system in FIG. 1, unlike the prior art which measures both the head speed and ball speed based on the Doppler signals obtained by one Doppler sensor, the head speed is measured based on the signals from the Doppler sensor 11, and the ball speed is measured based on the two images capturing the golf ball. Therefore both the speed of the golf club and the speed of the golf ball, which are the motion state of the impacting object and the motion state of the impacted object, can be accurately measured.

In the case of detecting a moment of impact, if impact is detected using only the voice signal, the sensor may respond to an unrelated sound, other than the impact of the golf club contacting the golf ball. If the moment of impact is detected by analyzing the Doppler signals, on the other hand, an expensive processor is required to quickly determine the moment of impact at high precision, which is impractical in terms of cost. Therefore according to the present embodiment, it is determined whether the impact sound of the golf ball is detected within a predetermined time from a point when the detection signal K1, to notify detection of an object, is supplied from the comparator 12*a*, that is, a point when the Doppler sensor 11*a* detected the golf club, therefore the moment of impact is detected more accurately than the case of detection using only the voice signal, without using an expensive processor. In other words, according to the measurement system in FIG. 1, the speed of the golf club and the speed of the golf ball can be determined at low cost and high precision.

In the case of the conventional measurement of the speed of the golf club and the speed of the golf ball, the entire time of a series of the swing operation of the player and the golf ball in flight are stored in a memory area, which is secured to store the data. Whereas the measurement system in FIG. 1 can accurately specify the moment of impact, as mentioned above, and only a minimum memory capacity for computing the speed can be secured in memory. Therefore the memory area required for the buffer memory 15 can be the minimum size required for accurately measuring the speed of the golf club. For example, to store the measurement data for 0.2 seconds before impact, only a 16 Kbytes memory area is necessary.

[Variant Form of Embodiment]

In the above mentioned embodiment, the microphone for detecting the impact sound is used as the detection unit that detects the moment of impact, but the present invention is not limited to this, and other units may be used. For example, as the detection unit that detects the moment of impact, a line sensor camera is used, so that the line sensor camera captures images of a golf ball placed in a predetermined position, and if a change is seen in the captured image, that is if the golf ball disappears from a captured image, this moment is detected as the moment of impact. As the detection unit that detects the moment of impact, a transmission type or reflection type laser sensor may also be used, so that the laser beam is irradiated onto the golf ball, and the moment of impact is detected by the presence of a transmitted laser beam or by the presence of a reflected laser beam.

In the above mentioned embodiment, two images for computing the motion state of the golf ball are captured by one imaging unit 23 in the stroboscopic camera 2, but the two images may be captured by different stroboscopic cameras 2 or by different imaging units 23. In other words, the number of stroboscopic cameras 2 or the number of imaging units 23 may be two or more, and the motion state of the golf ball may be computed using two or more images.

The measurement system in FIG. 1 can be used in a sports shop that carries golf clubs, or by a driving range used to practice golf.

Since the head measurement apparatus 1 can be designed to be a small portable apparatus, the head measurement apparatus 1 may be separated from the stroboscopic camera 2 (and the data processor 3 connected thereto), and used as a portable measurement apparatus which measures only speed in the impact measurement mode. In the case of a portable type, the user (player) can take it onto and use it at a driving range, for example. To use the head measurement apparatus 1 as a portable type, a battery and a seven-segment LED, for displaying the head speed of the measurement result, for example, are installed as an addition.

If the head measurement apparatus 1 is used separately from the stroboscopic camera 2, imaging by the stroboscopic camera 2 cannot be performed, hence the ball speed cannot be measured.

Therefore in the case of the measurement by a standalone head measurement apparatus 1, the Doppler sensor 11, comparator 12 and ADC 13, on the side not used for measuring the head speed, can be used for measuring the ball speed.

For example, in the case of the operation setting for right-handers, the head speed is measured based on the Doppler signals from the Doppler sensor 11*a*, however the Doppler sensor 11*b* is not used. As FIG. 3 shows, if the player is right-handed, the trajectory of the golf ball 42 which travels after impact by the golf club is included in the measurement range of the Doppler sensor 11*b*. This means that the Doppler sensor 11*b* can be used as a sensor for measuring the speed of the golf ball 42 (ball speed) after being impacted by the golf club. The speed of the golf ball 42 can be measured in the same way as the speed of the golf club. If this function is included in the head measurement apparatus 1 however, the buffer memory 15 must have a memory area for measuring the ball speed.

In the case of the head measurement apparatus 1 having the ball speed measurement function by the Doppler sensor 11 which is not in use, the ball speed measurement processing may be executed using the Doppler sensor 11 which is not in use, even if the head measurement apparatus 1 is connected with the stroboscopic camera 2, and the ball speed is provided to the data processor 3, along with the head speed. In this case, the data processor 3 can compute an average of the ball speed calculated by the computing unit 32 using the two images and the ball speed measured by the head measurement apparatus 1, and display the result as the final ball speed. Thereby the two Doppler sensors 11 can be effectively used, and the accuracy of measuring the ball speed can be improved.

In the case when the head measurement apparatus 1 has the ball speed measurement function, computing the ball speed and transmitting it to the data processor 3, along with the head speed, the computing unit 32 of the data processor 3 may compute the motion state of a golf ball other than a ball speed, such as the rotation frequency per unit time. Then the ball speed measurement function of the head measurement apparatus 1 can be effectively used, and the data processor 3 can be used for other functions, resulting in full utilization of the resources of each apparatus.

In the above embodiments, an example of measuring the speed of a golf club (impacting object) and the speed of a golf ball (impacted object) in golfing are measured, but the measurement system in FIG. 1 can also be used for measuring the speed of an impacting object and the speed of an impacted object in a sport other than golf. For example, the measurement system 1 can be used for baseball, where the speed of a bat (impacting object) and the speed of a baseball (impacted object) are measured, or for football (soccer), where the speed of a leg of a player (impacting object) and a ball (impacted object) are measured, or far tennis, where the speed of a tennis racket (impacting object) and a tennis ball (impacted object) are measured. The speed of the impacted object, however, is limited to the speed when the object, in a still state in a predetermined position, moves.

[Hardware Configuration Example of Computer]

The above mentioned series of processing steps can be executed by hardware or can be executed by software. To execute the series of processing steps by software, programs constituting the software are installed on a computer. The computer here includes a computer built in to dedicated hardware, and a general personal computer which can execute various functions by installing various programs.

Figure 5:
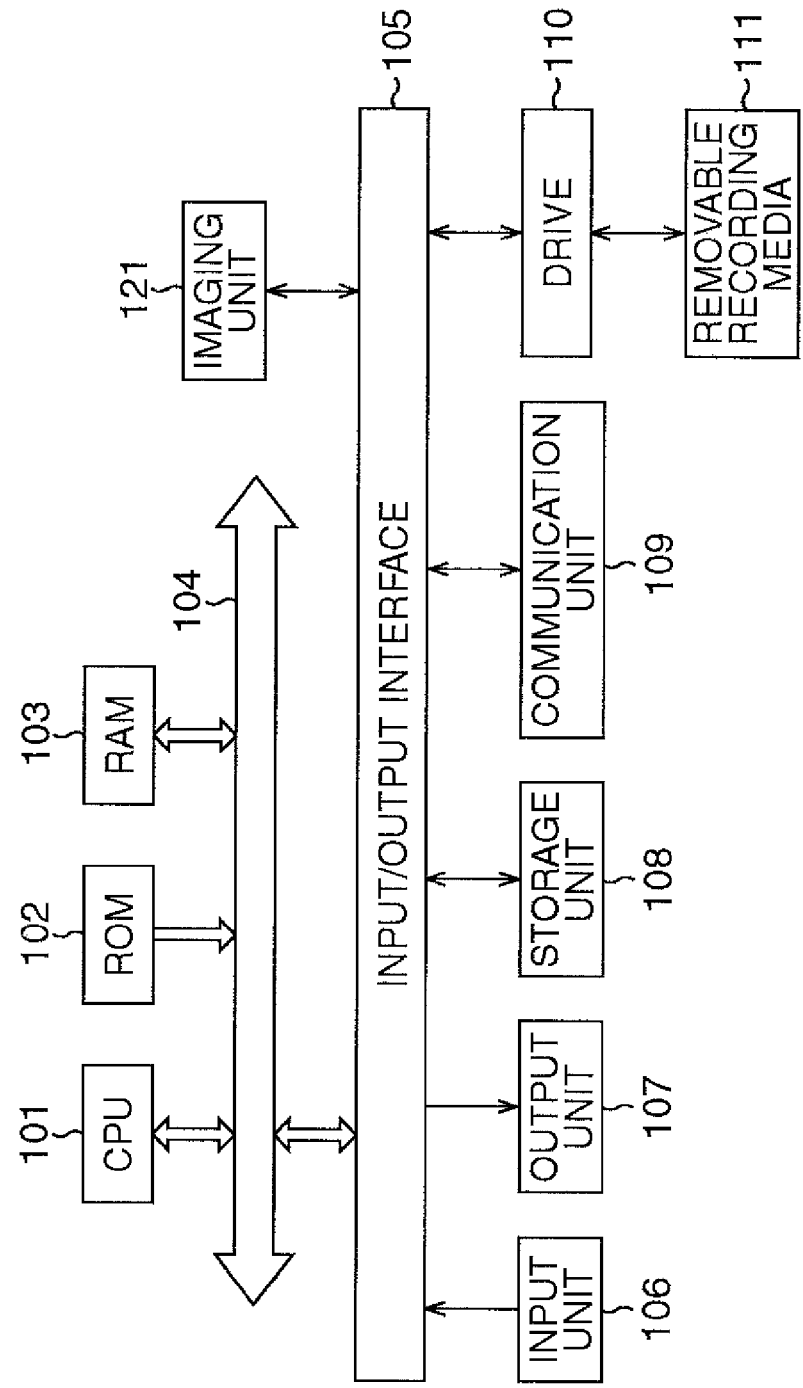
FIG. 5 is a block diagram depicting a configuration example of an embodiment of a computer to which the present invention is applied.

FIG. 5 is a block diagram depicting a hardware configuration example of a computer (personal computer) which executes the above mentioned series of processing steps using programs.

In the computer, a CPU (Central Processing Unit) 101, a ROM (Read Only Memory) 102 and a RAM (Random Access Memory) 103 are interconnected via a bus 104.

An input/output interface 105 is also connected to the bus 104. An input unit 106, an output unit 107, a storage unit 108, a communication unit 109 and a drive 110 are connected to the input/output interface 105.

The input unit 106 is constituted by a keyboard, mouse and microphone, for example. The output unit 107 is constituted by a display and a speaker, for example. The storage unit 108 is constituted by a hard disk and a nonvolatile memory, for example. The communication unit 109 is constituted by a network interface, for example. The drive 110 drives a removable recording media 111, such as a magnetic disk, an optical disk, a magneto-optical disk and a semiconductor memory.

The imaging unit 121 is constituted by a picture element, such as a CCD (Charge Coupled Device) or a CMOS (Complementary Metal Oxide Semiconductor). The imaging unit 121 images an object and supplies the image data on the imaged object to the CPU 101, for example, via the input/output interface 105.

In the computer having the above configuration, the CPU 101 loads programs stored in the storage unit 108 to the RAM 103 via the input/output interface 105 and the bus 104, for example, and executes the programs to perform the above mentioned series of processing steps.

Programs executed by the computer (CPU 101) can be recorded in a removable recording media 111, and provided as a package media. Programs can also be provided via cable or radio transmission media, such as a local area network, Internet and digital satellite broadcasting.

In the computer, programs can be installed in the storage unit 108 via the input/output interface 105, by installing the removable recording media 111 in the drive 110. Programs can also be received by the communication unit 109 via cable or radio transmission media, and installed in the storage unit 108. Programs can also be installed in advance in the ROM 102 and storage unit 108.

The programs executed by the computer may be a program where processing steps are performed in a time series according to the sequence described in this description, or a program where processing steps are executed in parallel or at a required timing, such as when called up.

In this description, a "system" refers to the entire apparatus constituted by a plurality of apparatuses.

Embodiments of the present invention are not limited to the above mentioned embodiments, but numerous modifications can be made without departing from the true spirit and scope of the invention.

What is claimed is:

1. A measurement apparatus comprising:
a first Doppler sensor which outputs a first transmission signal and receives a first Doppler signal, that is the first transmission signal returned after being reflected by an impacting object;
an impact timing detection unit that detects an impact timing, that is a moment when an impacted object is impacted by the impacting object;
an impacting object speed computing unit that computes a speed of the impacting object based on the first Doppler signals obtained between the detected impact timing and a previous timing before a predetermined period;
an image timing determination unit that determines a first imaging timing and a second imaging timing that capture images, based on the computed speed of the impacting object; and
an imaging unit that capture the images that contain the impacted object immediately after the impact and is used for computing a motion state of the impacted object, according to the determined imaging timings.

2. The measurement apparatus according to claim 1, further comprising:
a comparison unit that compares a signal level of the first Doppler signal with a predetermined reference level, and detects that the signal level of the first Doppler signal is the predetermined reference level or more; and
a storage unit that stores the first Doppler signals which are obtained during a predetermined period set in advance, and are sequentially updated by a new first Doppler signal having a level that is the predetermined reference level or more,
wherein the impacting object speed computing unit computes the speed of the impacting object, by using the first Doppler signals stored in the storage, unit, each time the first Doppler signals obtained during the predetermined period and stored in the storage unit, are updated by a new first Doppler signal.

3. The measurement apparatus according to claim 2,
wherein the imaging unit obtains images of the impacted object twice at different timings immediately after the impact, and the measurement apparatus further comprises an impacted object speed computing unit that computes the motion state of the impacted object based on the two images obtained by the imaging unit.

4. The measurement apparatus according to claim 3, further comprising:
a player imaging unit that images motion of a player upon impacting the impacted object using the impacting object; and a display unit that displays a moving image of the player obtained by the player imaging unit, speed of the impacting object obtained by computing and the motion state of the impacted object.

5. The measurement apparatus according to claim 1, further comprising:
a second Doppler sensor which outputs a second transmission signal and receives a second Doppler signal, that is the second transmission signal returned after being reflected by an impacting object; and
a switching unit that switches a target for computing the speed of the impacting object used by the impacting object speed computing unit, from the first Doppler signal to the second Doppler signal,
wherein the first Doppler sensor is for one of a right handed player and a left handed player, and the second Doppler sensor is for the other of the right handed player and the left handed player.

6. The measurement apparatus according to claim 1, wherein the impacting object is a golf club and the impacted object is a golf ball.

7. The measurement apparatus according to claim 1, wherein the first Doppler sensor and the impact timing detection unit are placed at a player's front direction that is vertical direction against a ball trajectory direction of the impacted object.

8. A measurement method by a measurement apparatus having a Doppler sensor, an impact timing detection unit, an imaging timing determination unit, a computing unit and an imaging unit, the method comprising the steps of:
the Doppler sensor outputting a transmission signal and receiving a Doppler signal, that is the transmission signal returned after being reflected by an impacting object;
the impact timing detection unit detecting an impact timing, which is a moment when an impacted object is impacted by the impacting object;
the computing unit computing a speed of the impacting object based on the Doppler signals obtained between from the detected impact timing and a previous timing before a predetermined period;
the imaging timing determination unit that determines a first imaging timing and a second imaging timing that capture images, based on the computed speed of the impacting object; and
the imaging unit capturing the images that contain the impacted object immediately after the impact and is used for computing a motion state of the impacted object, according to the determined image timings.

* * * * *

UNITED STATES PATENT AND TRADEMARK OFFICE
CERTIFICATE OF CORRECTION

| | | |
|---|---|---|
| PATENT NO. | : 8,959,981 B2 | Page 1 of 1 |
| APPLICATION NO. | : 13/358803 | |
| DATED | : February 24, 2015 | |
| INVENTOR(S) | : Masayoshi Arakawa et al. | |

It is certified that error appears in the above-identified patent and that said Letters Patent is hereby corrected as shown below:

In the Claims:

At column 14, claim 2, line 52, "in the storage, unit, each time" should read --in the storage unit, each time--.

At column 16, claim 8, line 12, "obtained between from the detected impact timing" should read --obtained between the detected impact timing--.

Signed and Sealed this
Twenty-fifth Day of August, 2015

Michelle K. Lee
*Director of the United States Patent and Trademark Office*